No. 740,817. PATENTED OCT. 6, 1903.
F. R. DAVIS.
TOY.
APPLICATION FILED JUNE 8, 1903.
NO MODEL.
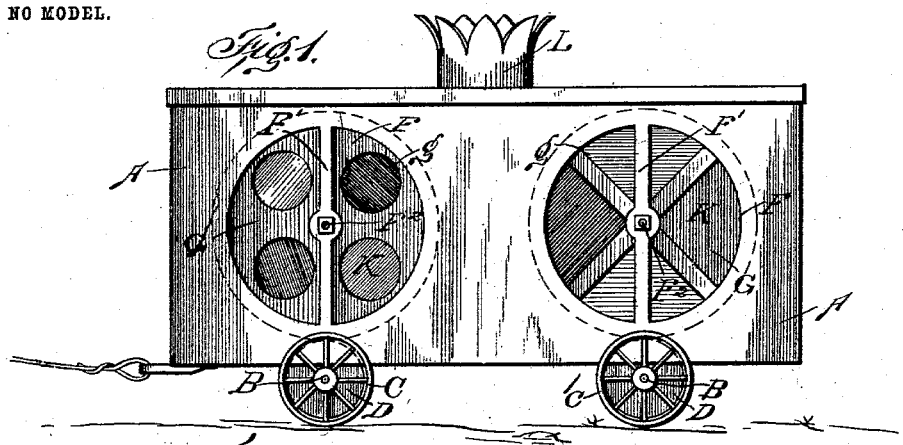
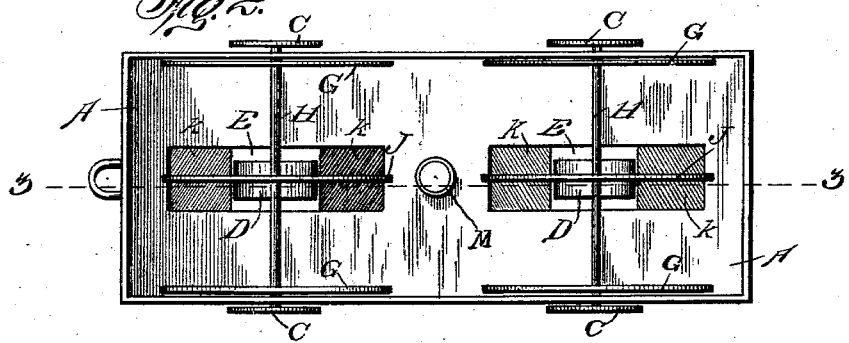
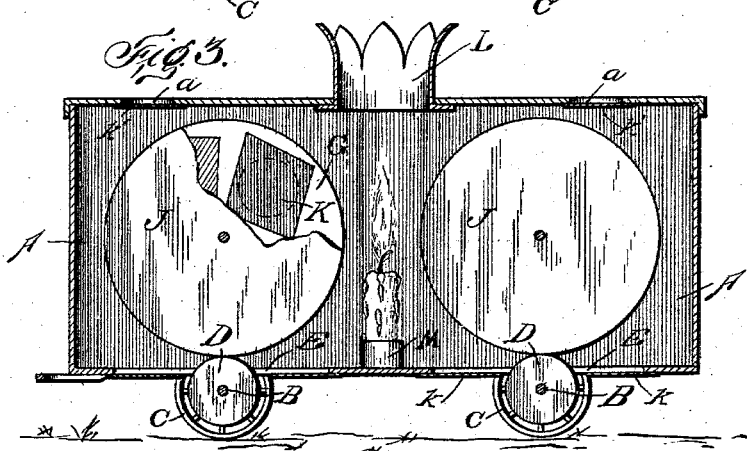
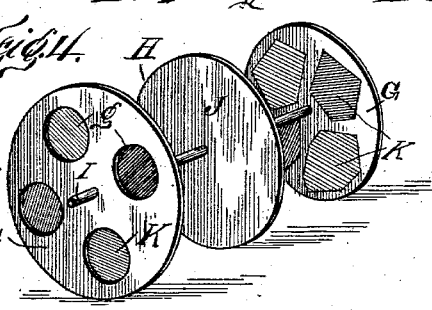
WITNESSES:
Wm C. McKenzie
Perry B. Turpin
INVENTOR
Frank R. Davis.
BY Munn & Co.
ATTORNEYS.

No. 740,817.     Patented October 6, 1903.

UNITED STATES PATENT OFFICE.

FRANK R. DAVIS, OF WASHINGTON, DISTRICT OF COLUMBIA, ASSIGNOR OF ONE-HALF TO LEONARD H. L. DAVIS, OF WASHINGTON, DISTRICT OF COLUMBIA.

TOY.

SPECIFICATION forming part of Letters Patent No. 740,817, dated October 6, 1903.

Application filed June 8, 1903. Serial No. 160,526. (No model.)

*To all whom it may concern:*

Be it known that I, FRANK R. DAVIS, a citizen of the United States, and a resident of Washington, in the District of Columbia, have made certain new and useful Improvements in Toys, of which the following is a specification.

My invention is an improvement in toys, being in the nature of a light-box designed to carry a candle or other illuminant to shine through fancy patterns of mica, colored tissue-paper, or other transparent or translucent material; and the invention consists in certain novel constructions and combinations of parts, as will be hereinafter described and claimed.

In the drawings, Figure 1 is a side elevation of my improved box. Fig. 2 is a top plan view thereof, the top of the box being removed. Fig. 3 is a vertical longitudinal section of the box on about line 3 3 of Fig. 2, and Fig. 4 is a detail perspective view of one of the revolving display-frames.

The box A may be of tin or other suitable material and of the rectangular form shown or of other suitable form and is mounted upon the axles B, carrying the wheels C, which run upon the ground-surface. The axles B are also provided at a point about midway between their ends with the pulleys D, which operate in openings E in the bottom of the box A and are arranged to drive the revolving display-frames when they are turned by means of the axle B, as presently described.

In the opposite sides of the box I provide the circular sight-openings F, through which are displayed the pattern-disks G on the opposite ends of the revolving display-frame H. These openings F are crossed by the bars F', which afford at their middles bearings F² for the ends I of the shafts of the display-frames H, such display-frames being thus journaled in connection with the box and being provided between the opposite disks G with pulleys J, which are in contact with the pulleys D on the axles B, so the display-frames will be caused to turn as the axles are turned by the rolling of the wheels C upon the ground as the box is dragged along.

The disks G are provided with openings $g$, which may be of any desired pattern and are covered by transparent or translucent coverings K, which may be of mica, tissue-paper variously colored, or of other suitable material. It will be noticed that as the frames H are caused to turn by the bearing of the pulleys J against the pulleys D of the drive-axle the different patterns on the display-frames will be shown as revolving at the opposite sides of the box, producing a pleasant and novel appearance and making the box a very attractive one.

The openings E in the bottom of the box for the pulleys D are elongated or extended at their ends and covered by mica or other suitable sheets $k$, and openings $a$ in the top of the box are covered by suitably-colored sheets $k'$, so the colored reflections will show from the plates $k$ upon the pavement and from the plates $k'$ at the top of the box when the candle is lighted in the box, as shown in Fig. 3. The top of the box is provided immediately above the candle with the stack L for the escape of heat and smoke from the candle.

I provide the revolving display-frames in pairs, as shown, one located near the front and the other near the rear of the box, and arrange the candle or other illuminant between the frames and at a point between the pulleys J. In practice I will make these pulleys J of bright tin, and they will operate as reflectors to aid in throwing the light from the candle in socket M upon the disks at the ends of the frames and having the patterns through which the colored light will be shown.

The toy can be cheaply made, and as it is pulled along the ground in use its pattern-disks G will be automatically revolved, displaying through the sight-openings in the sides of the box the figures on the said disks and increasing the attractiveness of the box. From the foregoing description it will also be noticed the display-frames are driven from the middles of the axles, and as the axles have the wheels C fixed to them the said axles and their pulleys D will be turned whenever the wheels C roll along the ground.

Having thus described my invention, what I claim, and desire to secure by Letters Patent, is—

1. The improvement in light-boxes herein described, comprising the box having the sight-openings in its opposite sides and the bars crossing said openings and provided with bearings for the ends of the display-frames, the display-frames comprising the shafts, the pattern-disks at the ends of said frames and provided with openings and with coverings therefor, the pulleys midway between the said pattern-disks, the axles journaled to the box and having the fixed driving-wheels and provided between the same with the pulleys engaging with the central pulleys of the display-frames, elongated openings being provided in the bottom of the box for the pulleys on the axles, and covering-sheets for the ends of said openings on opposite sides of said pulleys, substantially as set forth.

2. A light-box comprising the box provided in its sides with sight-openings, the display-frames journaled in the box and having at their ends pattern-disks provided with display-openings through which the light in the box may shine, the pulleys in said display-frames and the axles provided with the drive-wheels and with the pulleys engaging the pulleys of the display-frames, substantially as set forth.

3. The combination of the box having the sight-openings in its sides, a display-frame comprising a shaft, pattern-disks at the ends of said shaft and a pulley midway between the said disks, and the axle journaled to the box and having the drive-wheels and midway between the same a pulley engaging the pulley of the display-frame, substantially as set forth.

4. The combination in a light-box of the box having the openings in its bottom for the pulleys of the axles and the openings in its sides for the pattern-disks, the display-frames provided at their ends with the pattern-disks showing through the side openings in the box and between their ends with the pulleys, the axles journaled to the box, provided with the drive-wheels and between their ends with the pulleys operating in the bottom openings of the box and engaging with the pulleys of the display-frames, and the candle-socket arranged between the central pulleys of the display-frames, substantially as set forth.

5. A light-box having openings in its sides for the pattern-disks and in its bottom for the pulleys of the axles, the display-frames provided at their ends with the pattern-disks registering with the side openings in the box and midway between their ends with the pulleys having the reflecting-surfaces, the holder for the candle or other illuminant arranged between and in line with the reflecting-pulleys of the display-frames, and the axles journaled to the box and provided with the drive-wheels and with the pulleys engaging with the pulleys of the display-frames substantially as set forth.

FRANK R. DAVIS.

Witnesses:
SOLON C. KEMON,
AMOS W. HART.